May 7, 1929.  L. W. SERRELL  1,712,474
BROILER GRID
Filed June 30, 1928
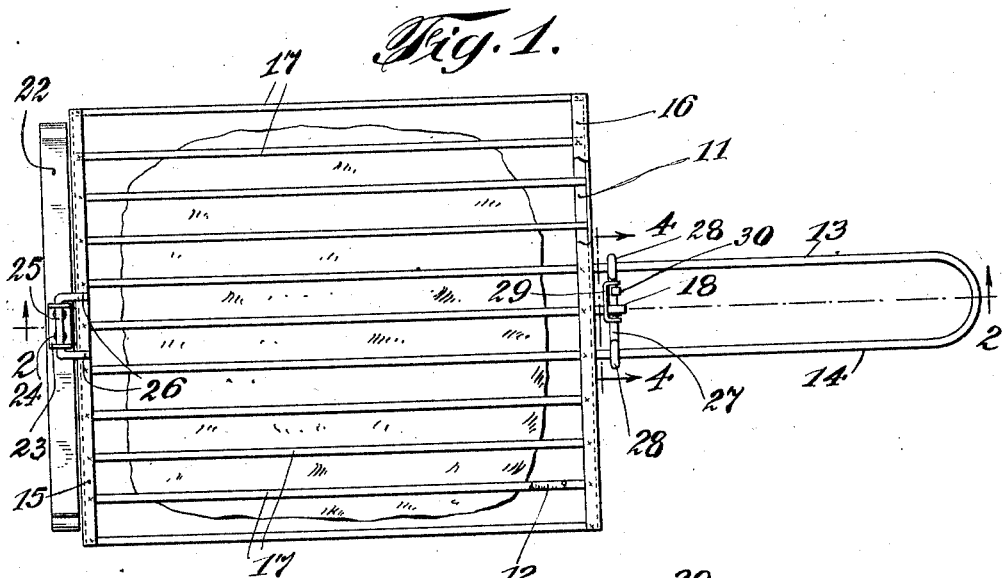
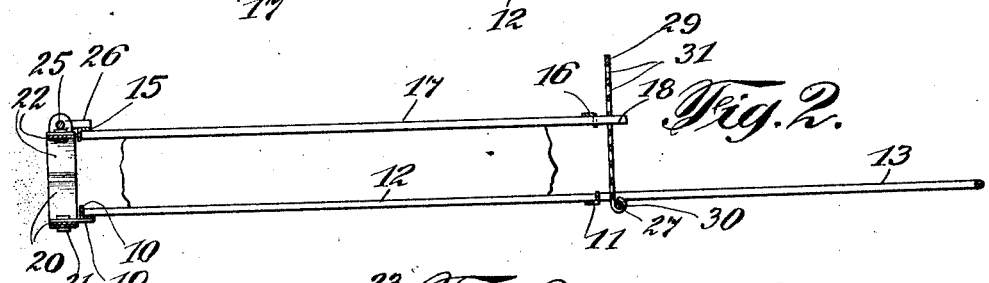
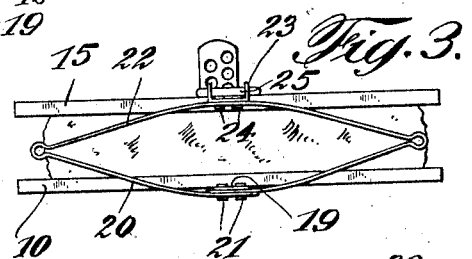
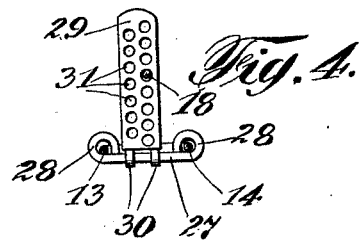
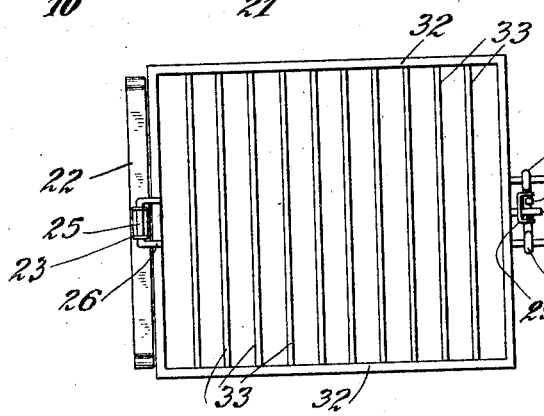
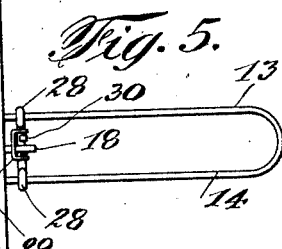
INVENTOR
Lemuel W. Serrell
BY
ATTORNEYS Patented May 7, 1929.

1,712,474

UNITED STATES PATENT OFFICE.

LEMUEL W. SERRELL, OF NEW YORK, N. Y., ASSIGNOR TO SERELCO, INC., OF NEW YORK, N. Y., A CORPORATION OF DELAWARE.

BROILER GRID.

Application filed June 30, 1928. Serial No. 289,582.

This invention relates to a broiler grid, that is, to a utensil comprising frames adapted to receive and engage food in order to hold or place the same before, or in association with, a fire or heater for broiler purposes. Heretofore, so far as I am aware in utensils of the type to which the invention relates it has been customary to merely hinge the frame members at one side thereof and to provide a handle and a latch at the other side thereof. Obviously broiler grids and like utensils thus constructed are not adapted to satisfactorily receive and grip articles of food of varying thicknesses and consequently are more or less limited in use to articles of food having uniformity in thickness and consistency.

The object of my invention is the provision of a broiler grid with the frame and grid members thereof so connected as to permit of a substantially universal movement in the same relatively to one another, that is, a broiler grid in which the grid frames are self adjusting to assume relative positions in an infinite number of planes relatively to one another, whereby it is possible to grip, engage and hold in position various articles of different thicknesses for broiling the same at one time. In carrying out the invention the utensil made in accordance therewith preferably comprises a set of frames, the members of which at corresponding sides are connected to a spring which is preferably a leaf spring, while at their opposite sides there is provided a handle and a latch or catch for connecting the same, as will be hereinafter more particularly described.

In the drawing Figure 1 is a plan of a broiler grid made in accordance with this invention, Figure 2 is a sectional elevation on line 2—2, Fig. 1, Fig. 3 is an end elevation illustrating the manner of connecting the grid members by the spring, Fig. 4 is a section on line 4—4, Fig. 1, and Fig. 5 is a plan illustrating a broiler grid of a construction slightly different to that shown in Fig. 1.

Referring to the drawing and particularly to Figs. 1 to 4 inclusive, it will be seen that in carrying out the invention the broiler grid, or similar utensil, made in accordance therewith is constructed to include a set of frames. These frames are preferably employed in pairs. As illustrated, one frame is made to include end bars 10 and 11 and suitably spaced rods 12 extending between and connected to these end bars. Certain of the spaced rods, preferably those disposed in the central portion of this frame, as indicated at 13 and 14, are extended through the bar 11 and looped to form a suitable handle for the utensil. The other frame is similarly constructed and includes end bars 15 and 16 extending between and connected in which there is a series of rods 17. One of these rods, preferably the central one, is extended beyond the bar 16, as indicated at 18, to form a part of a latch member as hereinafter more particularly described.

As illustrated, the end bar 10 is fitted with a bracket 19 to which one part 20 of a leaf spring is connected by being riveted thereto, as indicated at 21, or otherwise. The other part 22 of the leaf spring is provided with a bearing member 23 forming part of a hinge to which the end bar 15 is connected. This bearing member 23 is connected to this part of the spring by rivets 24, as indicated, or otherwise.

The hinge is completed by a pin 25 passing through suitable apertures provided therefor in the bearing member 23 and having ends 26 preferably bent at right angles thereto and suitably connected to the end bar 15. The leaf spring member may be made of any suitable material which will retain its resiliency and consequently must be of a material which is not affected by the heat to which the utensil is necessarily subjected in use. This bearing member is also preferably of a length which is substantially coextensive with the width of the hinged side members of the broiler grid frames, although of course, the spring may be made of any length or in any shape that will permit it to perform its intended functions.

Associated with the handle rods is a slide 27. The ends 28 of this slide are preferably looped upon the handle rods so that the slide is readily removable to position thereon. Carried by this slide there is a latch plate 29. At one end this is fitted with lugs or fingers 30 embracing the slide 27 so as to be pivotally connected thereto and adapted to turn thereon. In this latch plate there is a plurality of holes 31, any one of which is adapted to receive the projection 18 to which reference has hereinbefore been made in order to connect the grid frames to one another for use after the material to be broiled has been placed between them.

As shown in Fig. 5 the grid members may be constructed to include a continuous frame 32, that is, a frame which extends entirely around the same irrespective of its configuration and in which frames the rods 33 are so placed as to extend transversely, that is, in the opposite direction relatively to the frames, to that in which these rods are illustrated in the other form of the invention.

In the use of the broiler grid as hereinbefore described it will now be understood that the frames are mounted to swing relatively to one another by means of the hinge connection and also that in use these frames due to the action of the spring are permitted to assume innumerable positions in different planes which may be parallel to each other, or which may be at various angles to each other, dependent upon the nature of the articles or food placed between and to be secured in position by the broiler grid frames during a broiling operation. Obviously the broiler grid is self adjustable, within the limits of the expansibility of the spring, to embrace and grip any articles of food irrespective of the thickness and consistency of the same, for example, squabs or broiler chickens may be held in position in the grid as readily as slices of bacon or bread. Furthermore, due to the action of the spring making possible the universal self-adjustment of the parts of the grid articles of different thicknesses and consistencies may be simultaneously placed and held in position therein.

I claim as my invention:

1. In a grid, a set of frames, spaced rods therein, a spring fixedly connected to a frame at one end thereof and pivotally connected to another frame at the corresponding end thereof, and means for clamping the opposite ends of the said frames to one another whereby the frames automatically assume various positions to simultaneously engage and clamp articles of the same and different thicknesses placed between them.

2. In a grid, a set of frames, rods spaced in each frame, a leaf spring having one part thereof fixedly connected to one frame and another part hingedly connected to another frame, and a handle and latch for clamping the frames to one another whereby the said frames automatically assume any one of a number of positions to simultaneously engage and clamp articles of the same and different thicknesses placed between them.

3. In a grid, a pair of frames, rods spaced therein, a leaf spring having one part thereof fixedly connected to one of the frames and another part hingedly connected to the corresponding part of the other frame, and means for clamping the opposite ends of the frames to one another whereby the said frames are adapted automatically to assume any one of a plurality of positions to simultaneously engage and clamp articles of the same and different thicknesses placed between them.

4. In a grid, a pair of frames, rods spaced therein, a leaf spring, means for fixedly connecting one part of the said leaf spring to one of the said frames, means for hingedly connecting the opposite part of the said leaf spring to the corresponding part of the other frame, and means for clamping the oppositely disposed parts of the said frames to one another whereby the said frames are adapted to assume any one of a multiplicity of positions to simultaneously engage and clamp articles of the same and different thicknesses placed between them.

5. In a grid, a pair of frames, rods spaced therein, a leaf spring, means for fixedly connecting one part of the said leaf spring to one of the said frames, means for hingedly connecting the opposite part of the said leaf spring to the corresponding part of the other frame, a handle, and a latch associated with oppositely disposed parts of the frame and adapted to clamp the said frames to one another whereby the said frames are adapted to assume any one of a plurality of positions to simultaneously engage and clamp articles of the same and different thicknesses placed between them.

Signed by me this 14th day of June, 1928.

LEMUEL W. SERRELL.